US012808319B2

(12) United States Patent
Heggen

(10) Patent No.: US 12,808,319 B2
(45) Date of Patent: Nov. 24, 2026

(54) GAS EXCHANGE IN INTERNAL COMBUSTION ENGINES FOR INCREASED EFFICIENCY

(71) Applicant: Lars Harald Heggen, Drammen (NO)

(72) Inventor: Lars Harald Heggen, Drammen (NO)

( * ) Notice: Subject to any disclaimer, the term of this patent is extended or adjusted under 35 U.S.C. 154(b) by 200 days.

(21) Appl. No.: 17/926,931

(22) PCT Filed: May 23, 2021

(86) PCT No.: PCT/NO2021/050130
§ 371 (c)(1),
(2) Date: Nov. 21, 2022

(87) PCT Pub. No.: WO2021/242111
PCT Pub. Date: Dec. 2, 2021

(65) Prior Publication Data

US 2023/0203981 A1 Jun. 29, 2023

(30) Foreign Application Priority Data

May 29, 2020 (NO) .................................... 20200639

(51) Int. Cl.
*F02B 25/02* (2006.01)
*F01L 9/16* (2021.01)
(Continued)

(52) U.S. Cl.
CPC ................ *F02B 25/02* (2013.01); *F01L 9/16* (2021.01); *F01L 9/20* (2021.01); *F02B 75/02* (2013.01);
(Continued)

(58) Field of Classification Search
CPC ................ F02B 25/02; F02B 2075/025; F02B 2075/027; F02D 13/0242
(Continued)

(56) References Cited

U.S. PATENT DOCUMENTS 2,552,006 A 5/1951 Gill, Jr.
4,993,372 A 2/1991 Mott et al.
(Continued)

FOREIGN PATENT DOCUMENTS

| | | | | |
|---|---|---|---|---|
| DE | 10329958 A1 * | 1/2005 | ............. | F01L 1/181 |
| GB | 2554812 A1 | 4/2018 | | |
| WO | 2019035718 A1 | 2/2019 | | |

OTHER PUBLICATIONS

PCT/NO2021/050130. International Search Report (Jul. 23, 2021).

*Primary Examiner* — Lindsay M Low
*Assistant Examiner* — Omar Morales
(74) *Attorney, Agent, or Firm* — Peter Zura; LOZA & LOZA, LLP

(57) ABSTRACT

The invention pertains to gas exchange in internal combustion engines using low to zero-emission fuels. The combustion engine has the ability to regulate the quantity of air/fuel mixture in the cylinder using one or more exhaust valve(s) (2) that can have adjustable opening times in order to control the gas exchange in the cylinder so that exhaust and alternatively also air can be expelled into the exhaust system. By reducing the quantity of air and thus the quantity of fuel for each cycle, that combined with reduced compression pressure means that engines can operate with a higher expansion ratio by leaving the exhaust valve(s) (2) open through a part of the compression stroke to reduce the amount of air to the combustion and reduce compression and then pressure rise before combustion. Air volume and gas exchange are regulated by compressor(s) (5) as well as opening and closing of exhaust valve(s) (2) with the exhaust valve control (4); alternatively, also intake valves for 4-stroke engines.

20 Claims, 3 Drawing Sheets

(51) Int. Cl.
*F01L 9/20* (2021.01)
*F02B 75/02* (2006.01)
*F02D 13/02* (2006.01)

(52) U.S. Cl.
CPC .... *F02D 13/0242* (2013.01); *F02B 2075/025* (2013.01); *F02B 2075/027* (2013.01)

(58) Field of Classification Search
USPC ...................................................... 123/65 PE
See application file for complete search history.

(56) References Cited

U.S. PATENT DOCUMENTS

| | | | | | |
|---|---|---|---|---|---|
| 5,005,539 | A * | 4/1991 | Kawamura | F01L 9/20 | 123/90.11 |
| 5,025,765 | A | 6/1991 | Kawamura | | |
| 5,080,081 | A * | 1/1992 | Kawamura | F02B 19/165 | 123/559.1 |
| 5,131,354 | A | 7/1992 | Richeson | | |
| 5,870,982 | A | 2/1999 | Strawz | | |
| 2014/0060466 | A1 * | 3/2014 | Taylor | F02B 31/04 | 123/68 |

* cited by examiner

GAS EXCHANGE IN INTERNAL COMBUSTION ENGINES FOR INCREASED EFFICIENCY

The invention pertains to gas exchange in internal combustion engines for increased efficiency.

KNOWN TECHNOLOGY

The requirements to reduce CO2 emissions have led to there being increased focus on low and zero-emissions solutions for all types of propulsion machinery and other types of energy plant, including electric power production.

The challenges posed by eco-friendly fuels include their being more expensive than traditional fossil fuels. A realistic zero-emissions solution for shipping is ammonia, but this costs more than traditional operation using bunker oil.

One solution to compensate for the increased fuel costs is to improve the efficiency of the engines. In a traditional Otto process the efficiency of the process is a function of the expansion ratio. Efficiency can be improved by increasing the expansion ratio, but this is limited by the amount of cylinder pressure the engines can withstand and, in certain cases, the spontaneous ignition temperature of the fuel that is mixed with air in the cylinder.

Known technology includes engine designs using variable compression ratios. Coal and wood gas generators for running internal combustion engines.

Norwegian patent application 202000463 “Combustion chamber design in piston engines that use low-flammability fuels”.

Norwegian patent application 20191482 “Hybrid system for drones and other modes of transport”.

And Norwegian patent 343554, (PCT-WO/2019/035718) “Zero emission propulsion systems and generator sets using ammonia as fuel.” that describes ignition of ammonia using pilot ignition.

BRIEF DESCRIPTION OF THE INVENTION

In this description the term ‘compression stroke’ is used to describe the piston travel from bottom dead centre (BDC) up to top dead centre (TDC) before combustion and ‘expansion stroke’ is used for the piston travel from top dead centre (TDC) down to bottom dead centre (BDC) after combustion. The engine’s cycles are the different processes carried out during a full work cycle.

The compression and expansion ratios in a piston engine are normally the same. The advantage of this invention is the way in which the gas exchange in the engine is changed, so that the compression cycle is reduced and only implemented in the final part of the compression stroke. By this means the engines can have a higher expansion ratio than traditional engines. This is achieved by reducing the quantity of air that is used in the combustion process by allowing the exhaust valve(s) to remain open through part of the compression stroke, thereby also reducing compression and thus the pressure increase before combustion. What is envisaged is a non-turbocharged engine running on an Otto process, where the optimal pressure in the cylinder, after the expansion is complete, will be the same as the pressure in the exhaust system or the pressure outside the engine. The engine has then made maximum possible use of the pressure increase from the combustion. The heat from the exhaust can also be used to drive other power-generating units, or as a heat source for various purposes such as heating water. This will enable even better utilisation of the fuel.

For 2-stroke engines, the gas exchange will be regulated by the opening times of the exhaust valves combined with compressors that regulate the quantity of air or air/fuel mixture supplied.

For 4-stroke engines, the inlet and exhaust valves will be regulated as follows:

- during the Expansion stroke all the valves will be closed, as in traditional engines.
- during the Exhaust stroke the exhaust valve(s) will be open and the exhaust will be expelled, as in traditional engines.
- during the Induction stroke the exhaust valves will initially be closed and the inlet valve(s) will be open so that air or air/fuel mixture can be sucked or forced into the cylinder. When the correct quantity of air or air/fuel mixture has been sucked/forced into the cylinder the inlet valve(s) close while the exhaust valve(s) open again. This is done in order to reduce the amount of pumping effort required from the engine. In engines that have several inlet and exhaust valves each valve may be controlled individually in order to optimise the gas exchange.
- during the Compression stroke the exhaust valve(s) will be open for part of the upward stroke as described above.

Ammonia is a flammable substance that can be used as fuel for air-, sea- and land-based transport as well as in units designed for various purposes such as electric power production, water pumps etc. The disadvantage is that the flammability of ammonia is low, but as zero-emissions systems are defined as systems that do not emit CO2 the field is in practice limited to electric-, nuclear- or hydrogen-powered systems. Ammonia is the most straightforward means of storing hydrogen for hydrogen-powered systems.

In order to use ammonia as a fuel it will be advantageous to be able to use several propulsion systems, or alternatively to be able to use propulsion systems that can use several different fuels, such as dual-fuel or flex-fuel engines. The combustion characteristics of ammonia also mean that it will be advantageous for such engines to form part of a hybrid system, so that the internal combustion engines can operate at static load (constant load) and the hybrid system can deal with any load variations in the system. This can be achieved either using electrical hybrid systems where batteries and condensers will act as buffers to even out variations in the loads, or by using hydraulic or pneumatic hybrid systems where pressure tanks or pressure-loaded cylinders/vessels function as energy stores. The system will then have hydraulic pumps and motors, or compressors and turbines for pneumatic systems. If required, the power delivered by the internal combustion engines can be increased by supplying more air and fuels to the engine, or alternatively by running the engines purely on pilot fuel. This is realistic for ammonia-powered engines using diesel as the pilot fuel. If necessary, the engines can run as pure prechamber diesel engines. The exhaust valves will then close further down in the compression stroke and the ignition timing will be delayed in order to prevent cylinder pressure from being too high during combustion. This will reduce the efficiency, but will be a simple solution to enable high power output. Another solution is to use additional internal combustion engines, with traditional combustion, as part of the hybrid system to deliver high power when required.

To ensure good ignition of ammonia, a pilot ignition system will be essential to ignite the mixture of ammonia and air. This pilot ignition system can utilise pure hydrogen, other biofuels or traditional fossil fuels in both gaseous and liquid forms.

DETAILED DESCRIPTION OF THE INVENTION

Figure 1:
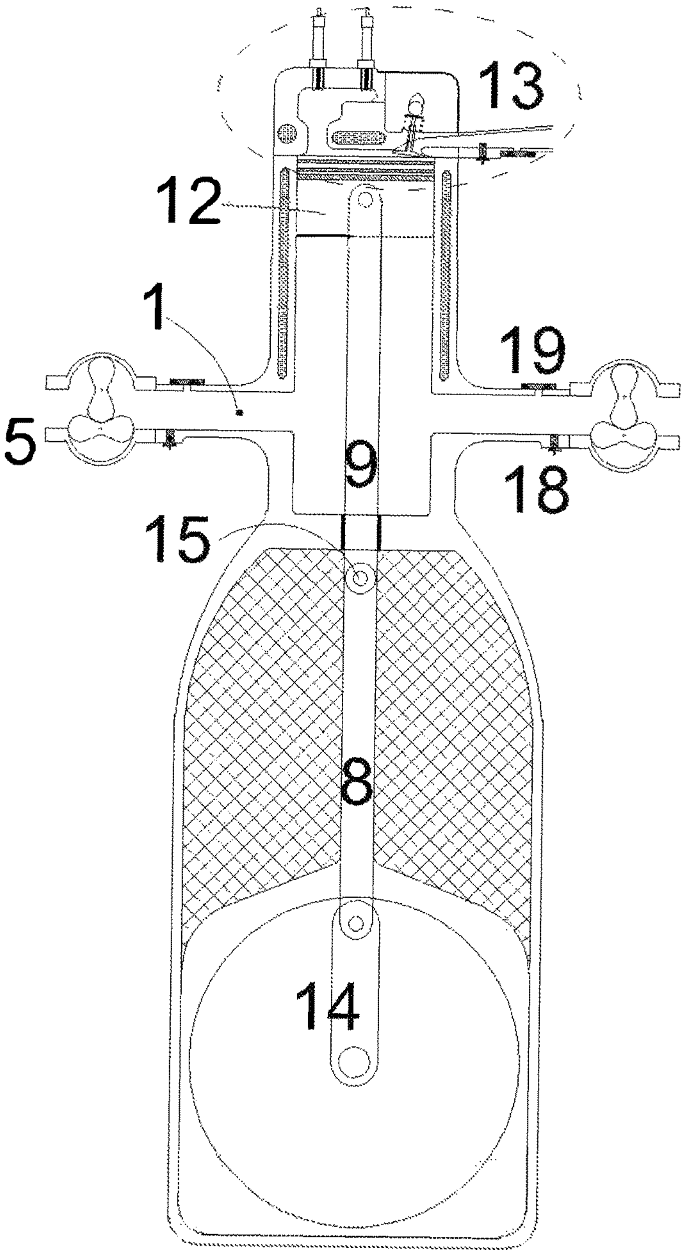
FIG. 1) is a drawing showing an embodiment for a 2-stroke crosshead engine.

The system can be used for both 2-stroke and 4-stroke piston engines. Engines using the Diesel, Otto, Atkinson or other processes for piston engines are all covered by this invention.

1) The piston engine's intake system.

Air is sucked into the cylinder here. Alternatively, it is forced in by a compressor (5) and/or also by a turbocharger. For 2-stroke engines, a compressor(s) (5) may be essential in order to regulate the supply of air. The compressor(s) (5) may have continuously variable drive(s) to enable them to regulate the supply of air.

Normally, the main fuel will be fed to the combustion chamber (10) via an injection nozzle for the main fuel (11), but it is possible to add the main fuel to the air in the intake system. This may be done using carburettor(s) or injection nozzle(s) for liquid fuels, or with a gas mixer or injection nozzle(s) for gaseous fuels. Solid fuels will normally be fed directly into the combustion chamber (10).

To ensure the correct air mass is fed to the cylinder, the intake system will normally have a temperature sensor (18) to measure the temperature of the air as well as an MAP sensor (19) to measure the pressure in the intake system. For 2-stroke engines the intake system may also have reed valves or other valve systems to control the flow of air.

In order to optimise the gas exchange, the height of the inlet ports in the cylinder of a 2-stroke engine can correspond to the height of the piston travel for compression of the air in the cylinder. This means that the height of the inlet ports in the cylinder of a 2-stroke engine will correspond to the height of the piston travel during the compression stroke where the exhaust valve(s) (2) are closed during optimal operation. Extra height may possibly be needed in order to ensure a quantity of air sufficient for the compression volume, plus a quantity of air that will be expelled into the exhaust system (3) for reduction of exhaust emissions. The purpose of this is to reduce the pumping effort required for the gas exchange. It is also possible to increase the pressure in the intake system and reduce the height of the inlet ports. However, during optimal operation of the engines the pressure in the intake system will be the same or a little higher than the pressure in the cylinder after expansion. Then the exhaust valve(s) (2) will be closed right down to bottom dead centre (BDC) so that it is the movement of the piston together with the height of the inlet ports that determines the quantity of air or air/fuel mixture fed to the cylinder.

2) Exhaust valve.

There will normally be a traditional exhaust valve. For 2-stroke engines there will be one or more exhaust valves that lead the exhaust gasses out of the cylinder. For 4-stroke engines there will be both exhaust and inlet valves.

3) The piston engine's exhaust system.

The exhaust may possibly be led further in order to wholly or partially drive other power-generation units such as a Stirling engine, or drive a turbocharger. For generator sets the exhaust heat can also be used to produce steam to drive a steam turbine.

If ammonia is used as the main fuel the ammonia may also be used as a working medium in a turbine circuit in a power-generation unit such as an electric generator. This may possibly be done by using the exhaust heat in a steam turbine first, and then using the remaining heat in an ammonia-driven turbine. The exhaust heat can also be used for other purposes, for example to produce water in a ship.

Depending on the types of main and pilot fuel, the exhaust system will have sensors measuring various exhaust parameters. These may include temperature (16) and pressure (17), as well as sensors for chemical composition. The signals are sent to the control system for the engines.

4) Control of the exhaust valves.

In 4-stroke engines there will be electromechanical, hydraulic or pneumatic control systems for both exhaust and inlet valves to optimise the gas exchange.

There may also be electromechanical, hydraulic or pneumatic valve control, where actuators control the hydraulics or the gas pressure that opens and closes the valve(s) (2). Traditional mechanical control is also possible, but this will possibly function best when the engines are operated at static load. This valve control system, combined with the compressor(s) (5), will control and ensure correct gas exchange in the cylinder.

An advantage with this system is that the exhaust valve(s) (2) can be controlled so as to adjust the quantity of air or air/fuel mixture fed to the cylinder and thus regulate the compression process. The exhaust valve(s) (2) will be controlled so that they are open part of the way upward in the compression stroke. Control of the exhaust valve(s) (2) may therefore be used to regulate the engines for different operating criteria—either to achieve optimal efficiency, or to allow them to function more as traditional engines if the objective is to maximise power output. Then the exhaust valve closes earlier (further down) in the compression stroke so that more air of air/fuel mixture is compressed. In this case the timings of injection and ignition may need to be changed in order to prevent cylinder pressure from rising too high. The exhaust valve(s) (2) can also be controlled for various combinations of efficiency and power output.

5) Compressor.

Depending on the engine's throttle setting and any concurrent need for air for emission reduction, the function of the compressor(s) will be to supply air to the engines. In conjunction with control of the exhaust valve(s) (4) the compressor(s) will help to supply the correct quantity of air to the engine. The compressor(s) may have continuously variable drives to improve their ability to adjust the air supply and reduce the pumping effort required.

If the engine(s) are operating purely on diesel it will be desirable in normal conditions to run the engines for maximum efficiency. If maximum power output should be required, the engine(s) may possibly run with less excess air than in traditional diesel operation. To compensate for any possible incomplete combustion when operating in this mode, the compressor(s) can be regulated to increase the supply of air to the cylinder during the gas exchange so that more air is expelled with the exhaust to enhance emission reduction. Less excess air during combustion can also help to reduce NOx formation.

6) The prechamber.

The prechamber is used for ignition of the pilot fuel. In engines with positive ignition, the pilot fuel will be ignited by the spark plug (7), while in compression ignition engines an injection nozzle and glow plug (7) will be used to supply and ignite the pilot fuel.

The ratio between the volume of the prechamber and the volume of the combustion chamber (10) will normally be the same as the ratio between the volume of air required to be in the cylinder for the process under normal operating conditions and the compression volume.

The cylinder's compression volume will comprise the volume between the piston (12) and cylinder head (13) when the piston (12) is at top dead centre (TDC) plus the volumes of the combustion chamber (10) and prechamber.

The reason for having the same ratio between combustion chamber (10) volume and prechamber volume as the ratio between the volume of air in the cylinder just before compression starts under normal operating conditions and the compression volume is to ensure that as much as possible of the air or any air/pilot fuel mixture that is in the combustion chamber (10) and the prechamber at the start of the compression cycle will be compressed into the prechamber. This is to ensure that the air or air/pilot fuel mixture in the prechamber has as little as possible of the main fuel mixed with it. This is especially important when using ammonia as the main fuel, as it is undesirable for combustion to take place with both organic fuels and ammonia together. Such mixed combustion can produce cyanide compounds $[:C\equiv N:]^-$ Other ratios between the volumes of the cylinder, combustion chamber (10) and the prechamber are also possible and may be especially relevant if lignin is used as the main fuel. Then a lean mixture of air and ethanol, for example, can be sucked in through the cylinder's intake system (1) to improve the combustion. Lignin is fed into the combustion chamber (10) via an injection device (11). An extra quantity of pilot fuel for ignition is fed into the prechamber via the pilot fuel injector and is ignited using an ignition device (7).

7) Pilot Fuel Ignition Device

In engines with positive ignition this will be a spark plug. In engines with compression ignition this will be an injector nozzle and glow plug placed in the prechamber (6). For compression ignition engines the pilot fuel system must also be large enough for the engines to be run as prechamber diesel engines if the main fuel is not available.

8) Connecting rod.

This is the connecting rod between the crankshaft (14) and the piston (12), alternatively between the crankshaft (14) and the piston rod (9)/crosshead (15) for crosshead engines.

9) Piston rod.

In crosshead engines this is the piston rod between the connecting rod (8)/crosshead (15) and the piston (12).

10) The combustion chamber.

For low-flammability fuels, not least fuels with low flame speed, it is important for the combustion chamber to be designed to ensure that the energy conversion from the combustion is as rapid as possible. Typically, this will mean a spherical or approximately spherical combustion chamber. The combustion chamber may either be a space in the cylinder head (13) or in the top of the piston (12). Alternatively, it may be split with spaces in both the cylinder head (13) and piston (12). If the combustion chamber is in the top of the piston (12), the prechamber (6) must have a connection to the combustion chamber to ensure that the pilot combustion ignites the main fuel properly. If the combustion chamber is in the cylinder head (13) it is important for the outlet from the combustion chamber to the cylinder to be large enough to ensure there is no pressure loss for the spent and unspent gases.

11) Injection Nozzle for the Main Fuel

Unless the air/main fuel mixture is mixed outside the engine in a carburettor, gas mixer or fuel nozzle mounted on or in the intake system (1), injection of the main fuel will be through injection nozzle(s) into the combustion chamber (10). These may be of any conventional nozzle design intended for use with both liquid and gaseous fuels. Other mixing principles may be used for solid fuels. For pure lignin, a pumping arrangement using heated lignin will normally be used. Lignin is an amorphous material with a glass transition temperature (Tg). The advantage of heating is that this produces a partly viscous material, so the lignin can be pumped into the combustion chamber (10) using an "injector unit" or other pumping arrangement. A pump or injector system for solid fuels will normally also have to be capable of pumping liquid fuels such as gasoline, bio-diesel or ethanol in order to allow solid fuels to be emptied out of the system before a shutdown. This might be the case if lignin is used. A hydraulically operated system will be advantageous if the fuel has to reach a certain temperature before it can be used. This may be the case for lignin. When using solid fuels such as lignin or coal/bio-coal the injection nozzle(s) for the main fuel should be placed so that the main fuel is pumped or sprayed immediately in front of, or straight into the outlet from the prechamber (6) to the combustion chamber (10) in order to use the stream of spent and unspent gases from the prechamber (6) to spread and mix the main fuel with air in the combustion chamber (10) and the cylinder.

12) Piston.

The piston in the cylinder of the internal combustion engines. Whole or parts of the combustion chamber (10) may be a space in the top of the piston, as is often the case in direct injection diesel engines. Where the combustion chamber (10) is part of the piston, the outlet from the prechamber (6) must point directly at this combustion chamber (10).

13) Cylinder head.

The cylinder head may comprise two or more parts. This solution can both simplify manufacture of the cylinder heads in terms of production technology and facilitate service and maintenance. When using marine fuel oils as pilot fuel, and/or using solid fuels such as coal and lignin, a multi-part cylinder head may be especially important as it is then easier to clean soot and other deposits out of the combustion chamber (10) and prechamber (6).

14) Crankshaft.

This is the engine's crankshaft.

15) Cross head.

This is the connection between the connecting rod (8) and piston rod (9) which eliminates sideways forces from the connecting rod (8).

16) Temperature Sensor

A temperature sensor to measure the temperature of the exhaust gas. This is used to measure the temperature of the exhaust as it is expelled into the exhaust system (3). This temperature gives a value for the pressure in the cylinder after expansion.

17) Pressure Sensor

In order to be able to optimise both pressure in the intake system (1) and the cylinder pressure to the pressure in the exhaust system (3) during the gas exchange a pressure sensor in the exhaust system (3) can be used to signal the exhaust pressure.

18) Air temperature sensor.

A temperature sensor to measure the temperature in the air or air/fuel mixture in the intake system (1).

19) MAP sensor.

Sensor for measuring the pressure in the intake system (1).

The optimal condition for achieving maximum efficiency in the process is for the pressure in the cylinder, after expansion is complete, to be the same as the pressure in the exhaust system (3) and for this exhaust pressure to be as close to the ambient or atmospheric pressure as possible.

The cylinder pressure after the expansion will be the controlling factor that determines how the gas exchange in the engine takes place. Cylinder pressure, together with the throttle setting, engine speed, data on the types of fuel used for both main and pilot fuels and signals from the emission reduction process will control the quantities of air, main fuel and pilot fuel to the engines. In turn, this will control injection and ignition timings as well as opening and closing of the exhaust valve(s) (2) with the control system for the exhaust valves (4).

The quantity of air fed to the cylinder will also include air needed for emission reduction. The quantity and types of fuel both for main and pilot fuels will give the air/fuel ratio (A/F). The quantity of air for gas exchange will be controlled by compressor(s) (5), alternatively also by inlet valves for 4-stroke engines and the height of the inlet ports (1) for 2-stroke engines. The engines can also be controlled in order to achieve a designated temperature range in the exhaust gas. The reason may be to exploit the exhaust for other purposes such as pyrolysis of solid fuels.

The principle of having pilot ignition from an additional pilot ignition system may also be applied to direct injection engines, whether they run on fossil diesel, bio-diesel, kerosene/jet fuel, gasoline, methanol/ethanol or LPG etc. The advantage is that the pressure in the compression stroke can be reduced in order to improve the efficiency of the engines by having a high expansion ratio and also ensure good combustion of the main fuel, with a greater proportion of the main fuel combusted by top dead centre (TDC). This will improve both efficiency and power output from the engines.

Instead of feeding solid fuels such as coal, lignin etc. directly to the engines, these fuels can be pyrolysed to produce gaseous fuels that are sucked into the intake system (1) together with air. Inter alia, this may be combined with coal that is used for production of coal gas and coke. The exhaust gas can then be used wholly or partially as a heat source for the pyrolysis process. For example, this can be part of a process for bio-coal production. During the 2nd World War wood gas from timber was used to produce gas by incomplete combustion in a wood gas generator. This gas was used as fuel in internal combustion engines. Coal can also be used in gas generators to produce a gas rich in carbon monoxide (CO). Some water can also be added during this combustion in order to ensure a certain hydrogen content ($H_2$) in the gas. This will improve its combustion properties so that the gas will ignite and combust better in internal combustion engines.

When ammonia is used as a main fuel the engines will be run with a "rich" air/ammonia mixture in order to reduce NOx formation during the combustion, as well as to compensate as much as possible for the reduced power yielded by this process compared with a traditional Otto or Diesel process. A "rich" ammonia mixture, combined with an extra supply of air to the exhaust, will also assist NOx reduction using SCR.

The advantage of this process is also that if the engines are run on pure diesel oil one can reduce the excess air during combustion, compared with traditional diesel engines, for the same reasons as apply to ammonia. In these cases, the engines will operate with increased pressure in the intake system (1) in order to supply more air, so that some of the air is expelled into the exhaust system (3) to assist with reduction of the exhaust emissions. When using diesel, a supply of air to the exhaust may be required, both for reduction of exhaust emission in a particulate filter and possibly also for SCR when combined with added ammonia or urea.

If desirable, the power output can be increased at the expense of efficiency through more air or air/fuel mixture being sucked or forced into the cylinder while the exhaust valve(s) (2) are closed earlier i.e., further down in the compression stroke. By this means the engine will have more air and can combust more fuel. To prevent combustion pressure from being too high under such operating conditions, the combustion will occur later in the process so that more of the combustion takes place in the expansion stroke.

This method can also be utilised with other fuels. When using LNG/CNG/LPG as a main fuel an injection nozzle (11) may be used for supplying main fuel, or the main fuel may be mixed with air in the intake system (1).

If the main fuel is mixed in the intake system (1), the amount of air/fuel fed to the cylinder might need to be adjusted so that non-combusted fuel is not expelled into the exhaust (3). This can be done using a vane valve or other type of air regulator fitted to the intake system (1) or by controlling the quantity of air/fuel by regulating the compressor (5). Alternatively, both methods may be combined. In 4-stroke engines the intake valve(s) can also be controlled using the same type of control mechanisms as for the exhaust valves (4).

A possible means of optimising the gas exchange is for the cylinder to have several valves that can be operated individually. In 4-stroke engines especially, the exhaust valve(s) (2) and inlet valves can be opened and closed individually. This may be essential in order to ensure that air, which will subsequently be expelled for emission reduction, can be mixed in. During the induction stroke the intake valves will first open for air, then one of them will close while another is held partly open, so that further on in the induction stroke the exhaust valves (2) can be opened in order to reduce the pumping effort required. The quantity of exhaust that is sucked back into the engine will be mixed with a small quantity of air. The compression stroke will proceed with closed inlet valves, while the exhaust valves (2) will stay open some way up the compression stroke so that the exhaust and then a little air will be expelled again before the exhaust valves (2) close and compression of the remaining air starts.

A compressor (5) is not essential for 4-stroke engines, as these can function as traditional engines where air is drawn into the cylinder.

If the main fuel is mixed with air in the intake system (1), a special inlet valve to the combustion chamber (10) as described in Norwegian patent 343554 can be used to achieve good ignition of a pilot fuel.

If for example a main fuel such as propane (LPG) is mixed with air in the intake system (1) it is not necessary to have a separate prechamber (6) with its own injection nozzle or ignition device (7). Then the ignition device can be a spark plug placed in the combustion chamber (10) instead of an injection nozzle (11). If a spark plug is used, it must be positioned so that it can ignite the air/fuel mixture. Typically, it can be positioned so that the air/fuel mixture is ignited from the middle of the combustion chamber (10). This will give the quickest combustion of the fuel. It will also ensure that the spark from a spark plug is not prevented from igniting the air/fuel mixture by any exhaust remaining in the cylinder and combustion chamber (10) and being compressed into the top of the combustion chamber (10). A spark plug should therefore be positioned so that any remaining exhaust does not prevent the fuel from being ignited.

It may be desirable for some exhaust to remain in the cylinder during operation because it will act as EGR. This can be regulated by controlling the quantity of air or air/fuel mixture that is sucked or forced into the cylinder and by controlling the exhaust valve(s) (2).

Figure 2:
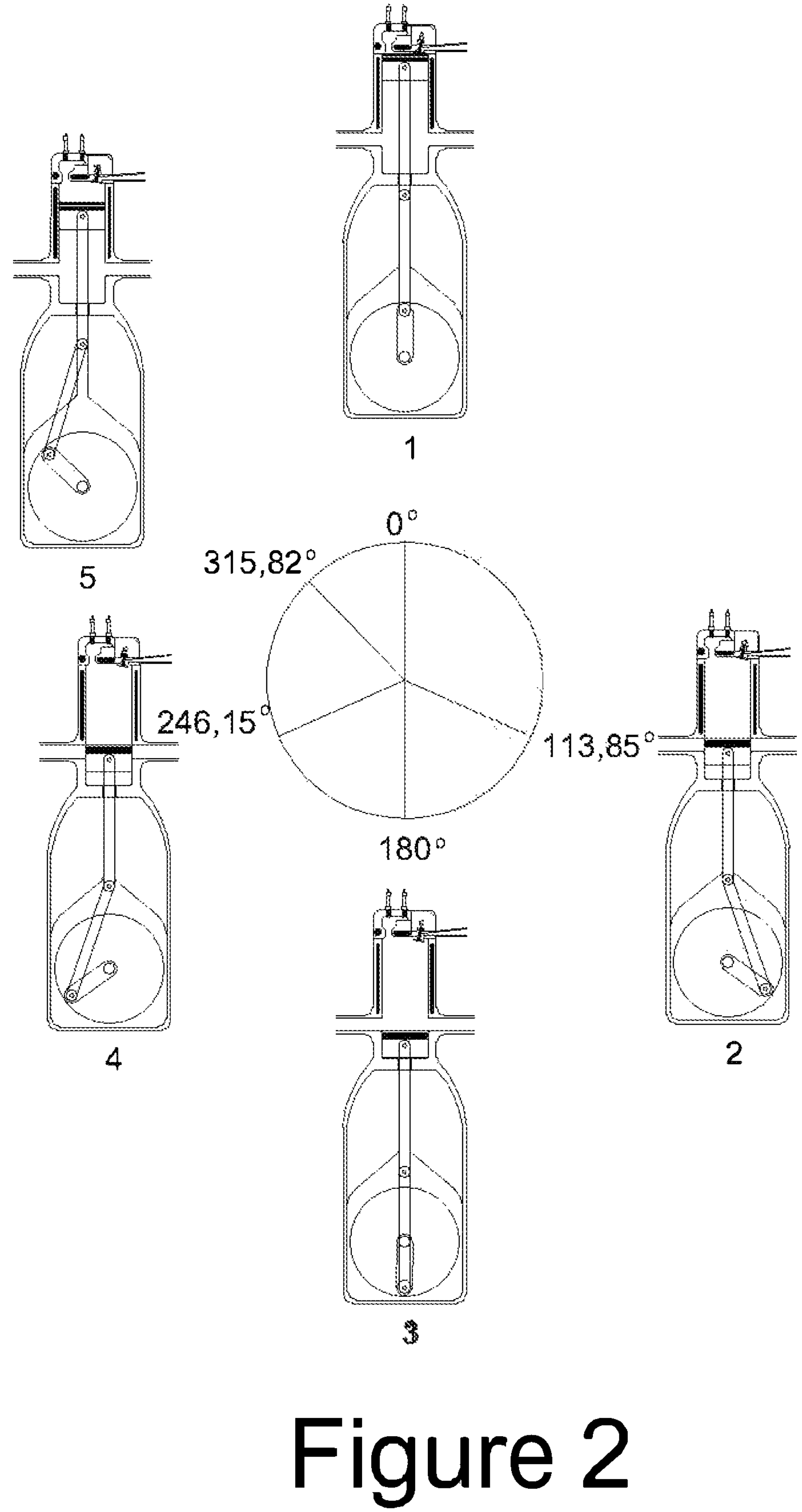
FIG. 2) is an illustration showing the different cycles in the embodiment in FIG. 1
Figure 3:
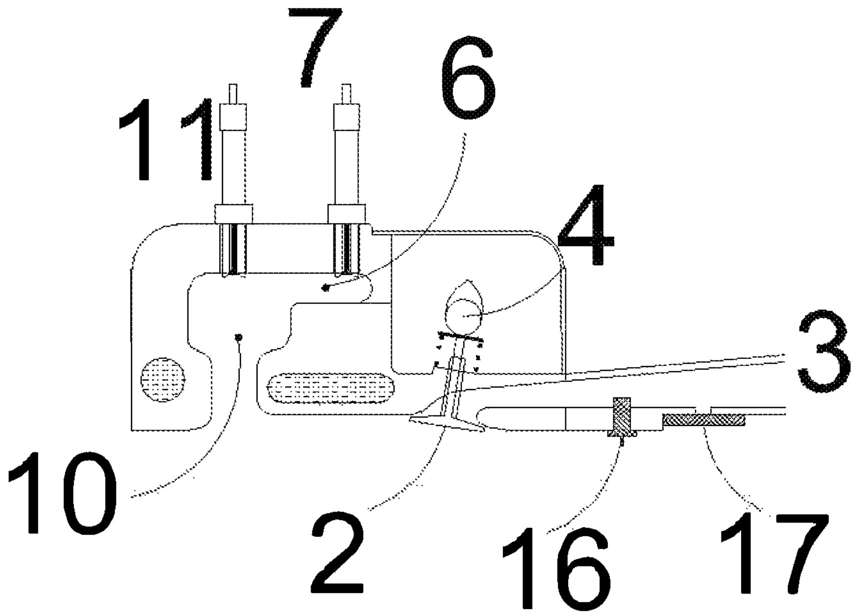
FIG. 3) is a drawing showing an embodiment of a cylinder head for the engine in FIG. 1

The principles for the processes in a 2-stroke engine with ammonia as the main fuel, which is ignited using a pilot ignition of diesel, based on the embodiment in FIG. 1 and FIG. 3 and the progression of the processes as illustrated in FIG. 2

The process described is based on the principles from a theoretical Otto process with the pressure increase at top dead centre (0 degrees). FIG. 2 illustrates the points between each cycle in the process for an engine that rotates clockwise:

1) The piston (12) is at top dead centre (0 degrees). All fuel has combusted and the pressure increase from the combustion is complete—as for an Otto process. The exhaust valve (2) is closed. Diesel has been injected into the prechamber (6) via the injection nozzle (7). Combustion of the diesel ignited the air/ammonia mixture in the combustion chamber (10), where ammonia had been supplied via the injection nozzle (11). The quantity of ammonia supplied was a little more than the quantity for stoichiometric combustion, both to reduce NOx formation and to contribute to NOx reduction of the exhaust (3) with SCR.

Between point 1 and point 2 is the EXPANSION cycle.

2) Expansion has taken place so that the pressure in the cylinder is now equal to the pressure in the exhaust system (3). This pressure is approximately the same as the ambient pressure around the engine. (Other ratios for the expansion and pressure in the cylinder as the expansion ends are dependent on the desired exhaust pressure, or whether the throttle setting means that optimal efficiency for the process cannot be sustained.) The top of the piston (12) has now reached the inlet ports (1) in the cylinder and the exhaust valve (2) will still be closed. The pressure in the intake system (1) is a little higher than in the cylinder in order to ensure the gas exchange.

Between point 2 and point 3 is the first part of the GAS EXCHANGE cycle.

3) The piston (12) is at bottom dead centre (180 degrees). The movement of the piston now causes the part of the cylinder volume that corresponds to the height of the inlet ports (1) to be filled with air. The exhaust valve (2) opens using a hydraulic valve control mechanism (4). The hydraulic valve control mechanism (4) is digitally controlled with an electric actuator that regulates the hydraulic pressure. This in turn controls the opening and closing of the exhaust valve (2). An extra advantage of low cylinder pressure is that the forces, and thus the pressure needed to control the exhaust valve (2), are lower than with traditional engines. This means the engine will have reduced mechanical loss. The exhaust valve (2) both opens and closes hydraulically.

The gas exchange is regulated both by the piston travel and the quantity of air forced by the compressor (5) into the cylinder's intake system (1). Increased pressure in the intake system (1) in relation to the pressure in the cylinder after expansion and in the exhaust system (3) is regulated by the compressor (5). This is so that the quantity of air fed to the cylinder is no greater than is needed to combust the fuels, plus an extra quantity of air to provide excess air for exhaust aftertreatment (SCR ref point 1) in the exhaust system (3). This is to reduce the pumping effort for the gas exchange to a minimum.

Between point 3 and point 4 is the second part of the GAS EXCHANGE cycle.

4) The piston (12) is now in its compression stroke, and the top of the piston (12) has now reached the top of the inlet ports (1) in the cylinder. The exhaust valve (2) will still be open and the remainder of the exhaust, together with air for reduction of exhaust emissions will still be expelled into the exhaust system (3).

Between point 4 and point 5 is the third and last part of the gas exchange which is EXHAUST EXPULSION together with air for emission reduction.

5) The piston (12) has now reached the point in the cylinder where the cylinder contains the right amount of air for combustion of the fuels. The exhaust valve (2) will now close so that compression of the air can start. Depending on the main fuel being used, this will be injected into the combustion chamber (10) during the compression. If the fuel is ammonia, it will be fed in at the end of the compression cycle so that most of the air will already have been compressed into the combustion chamber (10) and the prechamber (6). This is to ensure that there is as little ammonia as possible in the prechamber (6), in order to prevent formation of cyanide compounds $[C{\equiv}N]^-$. An advantage of this process is that when using ammonia as fuel the compression temperature can be kept down by limiting compression of the air so that decomposition of the ammonia is reduced. This is to prevent misfiring. To improve the mixture of air and ammonia another possibility is for the nozzle for the main fuel (11) to be positioned in the middle of the cylinder head (13), or at the other end of the cylinder head (13) in relation to the outlet from the combustion chamber (10). Then injection of ammonia with the nozzle for the main fuel (11) will start when the exhaust valve (2) has just closed. In this case the ratio between the combustion chamber (10) and prechamber (6) must be the same as, or approximately equal to, the engine's compression ratio in normal operation. This is to ensure that the air in the prechamber (6) is as clean as possible when diesel is injected into the prechamber (6) to ignite and combust.

Between point 5 and point 1 is the COMPRESSION cycle.

1) The process is now back at point 1. The piston (12) is now back at top dead centre (0 degrees) and pilot injection (7) of diesel into the prechamber (6) has already happened, so that the main fuel mixture in the combustion chamber (10) now combusts and the PRESSURE INCREASE occurs.

The principles for a 2-stroke engine with LNG as the fuel based on the embodiment in FIG. 1 and FIG. 3

This type of engine does not require a prechamber (6) with an injection nozzle/ignition device (7). LNG will be mixed stoichiometric ally with air in the intake system (1) in a gas mixer, so an injection nozzle for the main fuel (11) is replaced by a spark plug positioned in the middle of the combustion chamber (10) to ensure good ignition. A spherical combustion chamber (10) will be used because of the combustion rate of methane gas. A compressor (5) regulates the amount of air fed to the gas mixer, which supplies a quantity of air/fuel to the cylinder. After the gas exchange there will be a remnant of exhaust left behind as EGR. Among other reasons, this is because the calorific value of LNG is much higher than for ammonia. Otherwise, the progression of compression and expansion will be as described above. LNG (and the same applies to LPG and ammonia) must be heated in an evaporator before entering the gas mixer. In an LNG system there will also be a pressure buildup unit (PBU) in order to ensure even pressure in the fuel.

The progression of one full work cycle (one revolution) will be as for other fuels, but the values for position (degrees), and thereby volume ($m^3$), cylinder pressure (bar) and temperature (°C) at the end of each cycle will naturally enough be different from those shown in Table 1 (below) which is for ammonia operation.

Values for the theoretical processes for a 2-stroke engine with ammonia as fuel based on the embodiment in FIG. 1 and the processes as illustrated in FIG. 2

Table 1 is a simplified table showing values for the embodiment of a 2-stroke engine as illustrated in FIG. 2.

These example calculations are based on the engine only being supplied with an amount of energy for the pressure increase which is sufficient to correspond to the amount of energy produced by combustion of a pure stoichiometric mixture of air and ammonia. That is to say, without diesel as a pilot fuel. All gas processes are assumed to take place as though they run using pure air. This means that the increases in both temperature and pressure at point 1 and in the expansion cycle from point 1 to point 2 are calculated using physical data for pure air. The expansion process is also only calculated as an expansion of air, and with the same air mass as for the rest of the process, i.e., without any addition for the mass of fuels.

The process in Table 1 is calculated on the following engine dimensions:

Bore: 1000 mm, Stroke: 2000 mm, Length of connecting rod: 2500 mm.

Height of inlet ports: 422.35 mm, which gives an expansion length in the cylinder of 1577.65 mm. This corresponds to an expansion ratio of 40:1 with a compression volume of 31.8 L.

The calculations for the process in Table 1 are based on pure air.

This applies to the compression from point 5 to point 1, the pressure increase in point 1 and the expansion from point 1 to point 2. The mass of air in these cycles is 387.17 g.

TABLE 1

Shows values for position, pressure, temperature, volume and type of gas process between each cycle in the engine illustrated in FIG. 2.

| Point | Process between the points | Position (degrees) | Cylinder pressure (bar) | Temperature (°C) | Combustion chamber volume (L) | Gas process |
|---|---|---|---|---|---|---|
| 1 | Combustion | 0 | 176.7 | 4804.0 | 31.8 | Isochore/ (Isometric) |
| 2 | Expansion 1-2 | 113.85 | 1.0 | 876.3 | 1270.9 | Isentropic/ (Adiabatic) |
| 3 | Bottom Dead Centre | 180 | 1.0 | 27.0 | 1602.6 | |
| 4 | Gas exchange 2- 4 | 246.15 | 1.0 | 27.0 | 1270.9 | |
| 5 | Reduction of amount of gas in the cylinder 4-5 | 315.82 | 1.0 | 27.0 | 331.7 | |
| 1 | Compression 5- 1 | 0 | 26.9 | 498.6 | 31.8 | Isentropic/ (Adiabatic) |

(There will be small variations in the values in Table 1 compared with calculations from one point to the next in the table. This is due both to the numerical values in Table 1 being rounded to one decimal point and to the values stated in Table 1 being based on a complete process from point 1 and back to point 1).

A natural starting point for a more detailed explanation of the values in Table 1 is point 5, which is where the compression begins.

Point 5 in Table 1 is where the exhaust valve (2) has been closed and the compression starts. The volume in this embodiment is 331.7 L with a pressure of 1 bar and temperature of 27 °C. This corresponds to an air mass of 385.17 g. An isentropic compression to a volume of 31.8 L begins, and will result in a pressure after compression (TDC) of 26.9 bar and 498.6 °C.

At point 1 (TDC) a pressure increase occurs, based on the amount of energy from a stoichiometric combustion of ammonia. There is an air mass of 385.17 g, with a volume of 31.8 L, pressure of 26.9 bar and temperature 498.6 °C to which an amount of energy equal to 1182.2 kJ is now introduced. This corresponds to the energy in 63.56 g of ammonia. This results in a temperature increase for 385.17 g air of 4305.4K to 4804.0 °C. (Only the amount of energy introduced by the ammonia is used in the calculation; no admitted mass of ammonia is included.) This would have equated to an air/fuel ratio between air and ammonia of 385.17 g/63.56 g which is an A/F ratio of 6.06, or $\lambda=1$ for air/ammonia. The pressure increase after combustion will take place after an isochoric process and the pressure will increase to 176.7 bar. An isentropic expansion will begin.

At point 2 there has been an isentropic expansion of a mass of air of 385.17 g from point 1 to a volume of 1270.9 L. This gives a pressure after expansion of 1 bar and a temperature of 876.3 °C.

From point 2 to point 4 is gas exchange. For this embodiment, this takes place at a pressure of 1 bar and the air that is forced in maintains a temperature of 27 °C.

From point 4 to point 5, exhaust will be expelled. For this embodiment the quantity of air forced in between point 2 and point 4 is the quantity of air required for the combustion, so no air is expelled in the process between point 4 and point 5. The air will still have a pressure of 1 bar and a temperature of 27 °C.

The invention claimed is:

1. A gas exchange system for an internal combustion engine configured to increase efficiency, the system comprising: one or more exhaust valves configured with dynamically adjustable opening times, wherein the opening times are controlled by an electromechanical, hydraulic, or pneumatic control system to regulate a quantity of air or air/fuel mixture in a cylinder of the engine; and wherein the one or more exhaust valves are configured to remain open during an initial portion of the compression stroke, allowing partial expulsion of (i) exhaust gases, (ii) air, or (iii) both exhaust gases and air to optimize cylinder pressure, and wherein a portion of the intake system communicating with the cylinder has a preconfigured height selected to correspond to a stroke length during compression of the air in the cylinder during which the one or more exhaust valves are closed, wherein movement of a piston together with the preconfigured height determines a quantity of air or air/fuel mixture fed to the cylinder.

2. The gas exchange system of claim 1, wherein the system is configured to reduce a quantity of air and a quantity of fuel for each full work cycle, and wherein the reduced quantities of air and fuel, combined with reduced compression pressure, enable the engine to operate with a higher expansion ratio than traditional engines, thereby achieving increased efficiency.

3. The gas exchange system of claim 1, wherein the engine comprises a 2-stroke engine further comprising a compressor, wherein the compressor, in conjunction with the one or more exhaust valves, is configured to regulate the air or air/fuel supply to the cylinder to optimize the operation of the engine for at least one of maximum efficiency or maximum power output.

4. The gas exchange system of claim 1, wherein the engine comprises a 4-stroke engine, and wherein during an induction stroke of the engine:

(a) the one or more exhaust valves are configured to remain closed and one or more intake valves are configured to open, allowing an air or an air/fuel mixture to be introduced into the cylinder; and (b) when a desired quantity of the air or the air/fuel mixture is introduced, the one or more intake valves are configured to close, and the one or more exhaust valves are configured to simultaneously open, allowing exhaust to be drawn back into the cylinder to reduce the pumping effort required by the engine.

5. The gas exchange system of claim 1, wherein both a quantity of air used for combustion of main and pilot fuels and a quantity of the fuels are limited, such that the pressure increase resulting from combustion is utilized to make the pressure in the cylinder, after expansion, approximately equal to the pressure in the exhaust system or the pressure outside the engine.

6. The gas exchange system of claim 1, wherein the engine comprises a 2-stroke engine, and wherein a height of inlet ports in the cylinder is configured to correspond to a height of piston travel during the compression stroke when the one or more exhaust valves are closed during optimal operation, wherein the height of the inlet ports is adjustable to ensure a total quantity of air is sufficient for the compression volume and for expulsion into the exhaust system to reduce emissions.

7. The gas exchange system of claim 1, further comprising a temperature sensor installed in the exhaust system, the temperature sensor configured to measure the temperature of the exhaust gas after leaving the one or more exhaust valves, wherein the temperature is indicative of cylinder pressure after the expansion.

8. The gas exchange system of claim 1, wherein the remaining heat from the exhaust is configured to drive one or more power-producing units selected from the group consisting of Stirling engines, steam turbine systems, and turbine systems that use an alternative working medium, wherein, when ammonia or LPG is used as the main fuel, it is further utilized as a working medium in a turbine circuit of a power-generation unit, with the main fuel drawn in gaseous form from the turbine circuit after the turbine and before the condenser.

9. The gas exchange system of claim 1, wherein the one or more exhaust valves and any intake valves are controlled by at least one of electromechanical, hydraulic, pneumatic means, or combinations thereof, wherein each valve is configured to be individually controlled to optimize gas exchange in the cylinder.

10. The gas exchange system of claim 1, wherein solid fuels are converted by pyrolysis into gaseous fuels for the internal combustion engine, wherein the exhaust from the engine is utilized wholly or partially for heating in the pyrolysis process.

11. A gas exchange system for an internal combustion engine configured to improve efficiency, the system comprising: a plurality of exhaust valves configured with dynamically adjustable opening and closing times, wherein the opening and closing times are controlled by an electromechanical, hydraulic, or pneumatic control system to regulate a quantity of (i) air, (ii) a fuel mixture, or both air and the fuel mixture in a cylinder of the engine; and a control system configured to control the opening and closing of the plurality of exhaust valves such that the pressure in the cylinder after expansion is substantially equal to the pressure in the exhaust system, thereby optimizing the pressure conditions for the subsequent gas exchange process, and wherein a portion of the intake system communicating with the cylinder has a preconfigured height selected to correspond to a stroke length during compression of the air in the cylinder during which the plurality of exhaust valves are closed, wherein movement of a piston together with the preconfigured height determines a quantity of air or air/fuel mixture fed to the cylinder.

12. The gas exchange system of claim 11, wherein the control system is further configured to reduce a quantity of air and a quantity of fuel for each full work cycle, enabling the engine to operate with a higher expansion ratio than traditional engines, thereby achieving increased efficiency.

13. The gas exchange system of claim 11, wherein the engine comprises a 2-stroke engine further comprising a compressor, wherein the compressor, in conjunction with the plurality of exhaust valves, is configured to regulate the air or air/fuel supply to the cylinder to optimize the operation of the engine for at least one of maximum efficiency or maximum power output.

14. The gas exchange system of claim 11, wherein the engine comprises a 4-stroke engine, and wherein during an induction stroke of the engine:

(a) the plurality of exhaust valves are configured to remain closed and one or more intake valves are configured to open, allowing an air or an air/fuel mixture to be introduced into the cylinder; and (b) when a desired quantity of the air or the air/fuel mixture is introduced, the one or more intake valves are configured to close, and at least one of the plurality of exhaust valves is configured to open, allowing exhaust to be drawn back into the cylinder to reduce the pumping effort required by the engine.

15. The gas exchange system of claim 11, wherein both a quantity of air used for combustion of main and pilot fuels and a quantity of the fuels are limited, such that the pressure increase resulting from combustion is utilized to make the pressure in the cylinder, after expansion, approximately equal to the pressure in the exhaust system or the pressure outside the engine.

16. The gas exchange system of claim 11, wherein the engine comprises a 2-stroke engine, and wherein a height of inlet ports in the cylinder is configured to correspond to a height of piston travel during the compression stroke when the plurality of exhaust valves are closed during optimal operation, wherein the height of the inlet ports is adjustable to ensure a total quantity of air is sufficient for the compression volume and for expulsion into the exhaust system to reduce emissions.

17. The gas exchange system of claim 11, further comprising a temperature sensor installed in the exhaust system, the temperature sensor configured to measure the temperature of the exhaust gas after leaving the plurality of exhaust valves, wherein the temperature is indicative of cylinder pressure after the expansion.

18. The gas exchange system of claim 11, wherein the plurality of exhaust valves and any intake valves are controlled by at least one of electromechanical, hydraulic, pneumatic means, or combinations thereof, wherein each valve is configured to be individually controlled to optimize gas exchange in the cylinder.

19. The gas exchange system of claim 11, wherein solid fuels are converted by pyrolysis into gaseous fuels for the internal combustion engine, wherein the exhaust from the engine is utilized wholly or partially for heating in the pyrolysis process.

20. A method for optimizing gas exchange in an internal combustion engine to increase efficiency, the method comprising: adjusting an opening time of one or more exhaust valves in a cylinder of the engine, wherein the opening time is dynamically adjustable and controlled by an electromechanical, hydraulic, or pneumatic control system to regulate a quantity of air or air/fuel mixture within the cylinder; and maintaining the one or more exhaust valves in an open position during an initial portion of a compression stroke of the engine to allow partial expulsion of exhaust gases and/or air from the cylinder, thereby optimizing cylinder pressure for improved combustion efficiency, wherein a portion of the intake system communicating with the cylinder has a preconfigured height selected to correspond to a stroke length during compression of the air in the cylinder during which the one or more exhaust valves are closed, wherein movement of a piston together with the preconfigured height determines a quantity of air or air/fuel mixture fed to the cylinder.

* * * * *